Patented June 23, 1925.

1,543,543

UNITED STATES PATENT OFFICE.

OSCAR BALLY, OF BASEL, SWITZERLAND, ASSIGNOR TO THE FIRM HACO-GESELL-SCHAFT A.-G. BERN, OF GUMLIGEN, SWITZERLAND.

ALBUMEN DYESTUFF COMPOUND AND METHOD OF MAKING SAME.

No Drawing.   Application filed November 11, 1924.  Serial No. 749,257.

*To all whom it may concern:*

Be it known that I, OSCAR BALLY, a citizen of Switzerland, residing at Basel, Switzerland, have invented certain new and useful Improvements in Albumen Dyestuff Compounds and Methods of Making Same, of which the following is a specification.

My invention refers to a novel albumen dyestuff compound having bactericidal and therapeutical properties and to the method of making same.

German Letters Patent 324,747 referring to the production of similar compounds contains the statement that methylene blue is not capable of dying yeast.

I have now ascertained that this statement is true only in so far as the dyestuff salt of methylene blue has very little affinity to yeast albumen. On the other hand, I have discovered that stable compounds of yeast albumen with methylene blue or generally spoken with thiazine dyestuffs and which are insoluble in and resistive against water and have therapeutically valuable properties, are obtained if the well known reducing action of the yeast reductase is made use of, which allows converting methylene blue into its leuco compound. This latter compound has a considerably greater affinity to albumen and I thus succeed in combining leuco methylene blue with up to 10% by weight of the yeast albumen. By treating the leuco methylene blue which is thus combined with albumen, with the oxygen of the air or with other well known oxidizing agents, the dyestuff proper is obtained, this being shown by the fact that the compound which is practically colorless, on being treated with oxygen, assumes a deep blue color.

In practising my invention, I may for instance proceed as follows:—

*Example 1.*

To 1 kilo fresh yeast (which corresponds to 0.1 kilo dry yeast) a solution of 11 grams methylene blue in 100 c. cms. water is added drop by drop under vigorous stirring, which is continued for another half hour under heating to 50–60° C. After the reaction has come to an end, which is shown by the fact that the reaction mass which has assumed a light green color is no more decolored, the temperature is raised to boiling point and the deposit is allowed to settle. The leuco methylene blue yeast compound, which is colored slightly green, agglomerates and can easily be separated by decantation from the supernatant solution which has a clear blue color. The deposit is mixed with water to form a thin pulp and a vigorous air current is conducted through this pulp. After the lapse of an hour oxidation has come to an end and the product has assumed a deep blue color. It contains about 9% methylene blue in fixed combination. By centrifuging and subsequent drying and pulverizing a deep blue powder is obtained.

*Example 2.*

To 2 kilos well rinsed fresh yeast (which corresponds to 200 grams dry yeast) is added a solution of 24 grams methylene blue in 300 c. cms. water in a closed vessel provided with an agitating device and a heating coil, the air having previously been expelled from the vessel by introducing therein an inert gas, such as nitrogen, hydrogen, carbon dioxide or the like. Without removing the inert gas the mixture is heated under vigorous stirring to 50–60° C. After the reaction has lasted about an one hour, this mass is almost completely decolored and the solution is scarcely colored a light green. Its temperature is now raised to boiling point whereby the leuco methylene blue albumen compound is coagulated. After some time the supernatant liquor is removed by decantation and the deposit is treated at about 70° C. with 100 c. cms. of a 3% solution of peroxide of hydogen, thereby causing it to be converted by oxidation into the methylene blue albumen compound containing about 10% methylene blue and having a dark blue color. This product is now treated in the manner described with reference to Example 1.

*Example 3.*

9.5 kilos yeast albumen are suspended in 25 liters water and are heated to about 60° C., whereupon a solution of 500 grams methylene green in 10 liters water is slowly introduced in the form of a thin jet. The reaction mass is kept at 60–70° C. until it is almost entirely decolored. In case that this should not be the case after the lapse of an hour, reduction of the dyestuff is completed by means of a small quantity of sodium hydrosulfite, whereupon it is heated to the boiling point. After the deposit has settled down, the liquor is removed by means of a siphon and the pulp deposit is agitated by means of a vigorous air current. As soon as the oxidation of the leuco methylene green yeast albumen compound has come to an end, the product is dried as described with reference to Example 1.

*Example 4.*

19.6 kilos dry yeast are allowed to swell with 50 liters water and are then heated to 60-70° C. A solution of 400 grams indochromine R R are dissolved in 10 liters water and are added to the yeast, whereupon the mixture is kept at the same temperature for about half and hour. At the end of this time the mass is decolored and the reaction has come to an end, whereupon the mass is heated to boiling point thereby causing the compound to coagulate. It is now oxidized by means of air and is then dried as described with reference to Example 1. The final product has a dirty green color.

I wish it to be understood that I do not desire to be limited to the exact operations and products described, except as defined in the claims.

I claim:—

1. Method of making a therapeutically useful albumen dyestuff compound insoluble in water, comprising treating an albuminous body with a thiazine dyestuff so as to form an albumen leuco dyestuff compound and converting same into the albumen dyestuff compound by oxidation.

2. Method of making a therapeutically useful albumen dyestuff compound insoluble in water, comprising treating yeast albumen with a thiazine dyestuff so as to form an albumen leuco dyestuff compound and converting same into the albumen dyestuff compound by oxidation.

3. Method of making a therapeutically useful albumen dyestuff compound insoluble in water, comprising treating an albuminous body with methylene blue so as to form the albumen leuco methylene blue compound and converting same into albumen methylene blue by oxidation.

4. Method of making a therapeutically useful albumen dyestuff compound insoluble in water, comprising treating yeast albumen with methylene blue so as to form the albumen leuco methylene blue compound and converting same into albumen methylene blue by oxidation.

5. Method of making a therapeutically useful albumen dyestuff compound insoluble in water, comprising treating an albuminous body with a thiazine dyestuff so as to form an albumen leuco dyestuff compound and treating same with air so as to convert it into the albumen dyestuff compound by oxidation.

6. Method of making a therapeutically useful albumen dyestuff compound insoluble in water, comprising treating yeast albumen with a thiazine dyestuff so as to form an albumen leuco dyestuff compound and treating same with air so as to convert it into the albumen dyestuff compound by oxidation.

7. Method of making a therapeutically useful albumen dyestuff compound insoluble in water, comprising treating an albuminous body with methylene blue so as to form albumen leuco methylene blue compound and treating same with air so as to convert it into albumen methylene blue by oxidation.

8. Method of making a therapeutically useful albumen dyestuff compound insoluble in water, comprising heating about 100 parts yeast albumen with a solution of about 10 parts of a thiazine dyestuff to decoloration, boiling, separating the deposit, suspending same in water and treating with an oxidizing agent.

9. Method of making a therapeutically useful albumen dyestuff compound insoluble in water, comprising heating about 100 parts yeast albumen with a solution of about 10 parts of methylene blue to decoloration, boiling, separating the deposit, suspending same in water and treating with air.

10. As a new product, an albumen thiazine dyestuff compound, being a deeply colored substance, insoluble in water and having a vigorous bactericidal action.

11. As a new product, an albumen methylene blue compound, being a deeply blue colored substance, insoluble in water and having a vigorous bactericidal action.

In testimony whereof I affix my signature.

OSCAR BALLY.